US 8,099,508 B2

(12) United States Patent
Mao et al.

(10) Patent No.: US 8,099,508 B2
(45) Date of Patent: Jan. 17, 2012

(54) METHOD OF USING TOKENS AND POLICY DESCRIPTORS FOR DYNAMIC ON DEMAND SESSION MANAGEMENT

(75) Inventors: Weidong Mao, West Windsor, NJ (US); Neville A. Black, Collegeville, PA (US); Charles L. Compton, Bryn Mawr, PA (US)

(73) Assignee: Comcast Cable Holdings, LLC, Philadelphia, PA (US)

( * ) Notice: Subject to any disclaimer, the term of this patent is extended or adjusted under 35 U.S.C. 154(b) by 1151 days.

(21) Appl. No.: 11/275,175

(22) Filed: Dec. 16, 2005

(65) Prior Publication Data

US 2007/0143457 A1  Jun. 21, 2007

(51) Int. Cl.
*G06F 15/16* (2006.01)
(52) U.S. Cl. ................... 709/229; 709/227
(58) Field of Classification Search ........... 709/223, 709/226, 227, 229; 725/88, 34, 25; 380/281
See application file for complete search history.

(56) References Cited

U.S. PATENT DOCUMENTS

| 5,590,202 | A | * | 12/1996 | Bestler et al. ............ 380/212 |
| 5,619,247 | A | * | 4/1997 | Russo ..................... 725/104 |
| 5,644,714 | A | * | 7/1997 | Kikinis ................... 709/219 |
| 5,680,457 | A | * | 10/1997 | Bestler et al. ............ 380/239 |
| 5,739,511 | A | * | 4/1998 | Pedersen ................. 235/380 |
| 5,818,439 | A | * | 10/1998 | Nagasaka et al. ......... 725/87 |
| 5,835,724 | A | * | 11/1998 | Smith ..................... 709/227 |
| 5,956,716 | A | * | 9/1999 | Kenner et al. ............ 1/1 |
| 5,995,608 | A | * | 11/1999 | Detampel et al. ........ 379/205.01 |
| 6,069,957 | A | * | 5/2000 | Richards ................. 380/281 |
| 6,154,528 | A | * | 11/2000 | Bennett et al. ........... 379/93.25 |
| 6,157,377 | A | * | 12/2000 | Shah-Nazaroff et al. .... 715/719 |
| 6,253,375 | B1 | * | 6/2001 | Gordon et al. ............ 725/88 |
| 6,385,309 | B1 | * | 5/2002 | Bennett et al. ........... 379/93.25 |
| 6,502,137 | B1 | * | 12/2002 | Peterson et al. .......... 709/229 |

(Continued)

FOREIGN PATENT DOCUMENTS

WO  WO 2005/008419 A2  1/2005

OTHER PUBLICATIONS

Tino Pyssysalo and Lleo Ojala, Causal Modeling of a Video-on-Demand System Using Predicate/Transition Net Formalism, EUROMICRO 96. 'Beyond 2000: Hardware and Software Design Strategies'., Proceedings of the 22nd EUROMICRO Conference, pp. 625-632.*

*Primary Examiner* — Firmin Backer
*Assistant Examiner* — Michael A Chambers
(74) *Attorney, Agent, or Firm* — Banner & Witcoff, Ltd.

(57) ABSTRACT

Tokens and policy descriptors are used for dynamic on demand session management in a distributed and scalable architecture for on demand sessions and resource management. The architecture includes an on demand client, a purchase server, and a session manager. A purchase token is generated at the purchase server and assigned to the on demand client. The purchase token represents at least one requested asset. In response to an on demand session set-up request corresponding to the purchase token from the on demand client to the session manager, the purchase token is expanded to generate at least one dynamic policy management descriptor for the on demand session. This provides token-based purchase authorization and policy management for on demand services.

19 Claims, 2 Drawing Sheets

U.S. PATENT DOCUMENTS

| | | | |
|---|---|---|---|
| 6,594,825 B1* | 7/2003 | Goldschmidt Iki et al. | 725/53 |
| 6,598,074 B1* | 7/2003 | Moller et al. | 709/204 |
| 6,643,361 B2* | 11/2003 | Bennett et al. | 379/93.25 |
| 6,810,525 B1* | 10/2004 | Safadi et al. | 725/1 |
| 6,870,912 B2* | 3/2005 | Bennett et al. | 379/93.25 |
| 6,950,895 B2* | 9/2005 | Bottom | 710/301 |
| 6,968,364 B1* | 11/2005 | Wong et al. | 709/217 |
| 7,054,935 B2* | 5/2006 | Farber et al. | 709/226 |
| 7,085,961 B2* | 8/2006 | Chang et al. | 714/13 |
| 7,093,272 B1* | 8/2006 | Shah-Nazaroff et al. | 725/39 |
| 7,149,290 B2* | 12/2006 | Bennett et al. | 379/93.25 |
| 7,240,356 B2* | 7/2007 | Iki et al. | 725/48 |
| 7,313,595 B2* | 12/2007 | Rust | 709/204 |
| 7,339,786 B2* | 3/2008 | Bottom et al. | 361/686 |
| 7,509,321 B2* | 3/2009 | Wong et al. | 707/7 |
| 7,644,103 B2* | 1/2010 | Smith et al. | 725/131 |
| 2002/0029186 A1* | 3/2002 | Roth et al. | 705/37 |
| 2002/0029274 A1* | 3/2002 | Allen | 709/226 |
| 2002/0085713 A1* | 7/2002 | Feig et al. | 380/200 |
| 2002/0124114 A1* | 9/2002 | Bottom et al. | 709/251 |
| 2002/0169797 A1* | 11/2002 | Hegde et al. | 707/500.1 |
| 2002/0194412 A1* | 12/2002 | Bottom | 710/302 |
| 2003/0014368 A1* | 1/2003 | Leurig et al. | 705/64 |
| 2003/0118164 A1* | 6/2003 | Bennett et al. | 379/93.25 |
| 2003/0154398 A1* | 8/2003 | Eaton et al. | 713/201 |
| 2004/0013249 A1* | 1/2004 | Bennett et al. | 379/93.25 |
| 2004/0119814 A1* | 6/2004 | Clisham et al. | 348/14.08 |
| 2004/0221045 A1* | 11/2004 | Joosten et al. | 709/227 |
| 2005/0021654 A1* | 1/2005 | Kern et al. | 709/211 |
| 2005/0120131 A1* | 6/2005 | Allen | 709/233 |
| 2005/0141685 A1* | 6/2005 | Bennett et al. | 379/114.14 |
| 2005/0216627 A1* | 9/2005 | Goud et al. | 710/100 |
| 2006/0077899 A1* | 4/2006 | Yla-Outinen et al. | 370/235.1 |
| 2006/0167903 A1* | 7/2006 | Smith et al. | 707/100 |
| 2006/0218281 A1* | 9/2006 | Allen | 709/226 |
| 2006/0224768 A1* | 10/2006 | Allen | 709/234 |
| 2006/0230415 A1* | 10/2006 | Roeding | 725/34 |
| 2007/0083899 A1* | 4/2007 | Compton et al. | 725/87 |
| 2007/0118849 A1* | 5/2007 | Kisel et al. | 725/25 |
| 2008/0031132 A1* | 2/2008 | Compton et al. | 370/230 |
| 2009/0089846 A1* | 4/2009 | Wang et al. | 725/98 |

* cited by examiner

METHOD OF USING TOKENS AND POLICY DESCRIPTORS FOR DYNAMIC ON DEMAND SESSION MANAGEMENT

BACKGROUND OF THE INVENTION

1. Field of the Invention

The invention relates to on demand services such as video on demand (VOD), network PVR, IP streaming as well as other two-way interactive services. The invention further relates to dynamic on demand session management.

2. Background Art

The use of video on demand (VOD) has become widespread. For example, VOD is available in certain cable television (CATV) networks. To implement a video on demand platform, it is necessary for the architecture to address resource allocation and to address on demand session management.

In one approach to on demand network architecture, network operators offer video on demand (VOD) services through interactive video systems that feature tight integration and customization across several system components, such as asset management, session and resource management, billing and entitlement, network transport, and set top client applications.

In a more recent approach to on demand network architecture, an architecture for on demand session and resource management is proposed that is both distributed and scalable. This architecture is suitable for multiple interactive services serving multiple types of devices.

Background information pertaining to a distributed and scalable architecture for on demand session and resource management may be found in International Patent Application Publication No. WO 2005/008419 A2.

In a distributed session and resource management architecture for on demand service such as video on demand (VOD), authorization and policy management present a challenge. Existing approaches to policy management are typically static, and not dynamic at the session set up time.

For the foregoing reasons, there is a need for an improved approach to authorization and policy management.

SUMMARY OF THE INVENTION

It is an object of the invention to provide a method of using tokens and policy descriptors for dynamic on demand session management.

The invention involves architecture and functional flow for token-based purchase authorization and policy management for on demand services such as video on demand (VOD), network PVR, IP streaming, as well as other two-way interactive services. At the more detailed level, the architecture comprehends the on demand client, navigation server, purchase server, and other on demand back office components such as the session manager and entitlement server.

In accordance with the invention, a purchase token is generated and assigned by the purchase server to the on demand client and is used in on demand session signaling messages. The authorization of the on demand session is performed by the purchase server based on entitlement information from the entitlement database.

Further, in accordance with the invention, various dynamic policy management descriptors for on demand service can be generated through the purchase server for each particular purchase token at session set up time. These dynamic policy management descriptors may include, but are not limited to, dynamic asset playlist, priority, CA (conditional access) related descriptor, bandwidth/codec to be required, etc.

At the more detailed level, the invention comprehends an interface between the purchase server and the session manager to address these policy related requirements.

The advantages associated with embodiments of the invention are numerous. The invention addresses session authorization and policy management for on demand services such as video on demand (VOD). Using the purchase token, in preferred embodiments, provides a uniform way to authenticate on demand services for a wide variety of interactive content or application offerings to the subscribers. In addition, in preferred embodiments, server based policy management that is generated dynamically for each on demand session provides flexibility and offers personalization for various devices and services.

DETAILED DESCRIPTION OF THE PREFERRED EMBODIMENT

1. Next Generation on Demand (NGOD) Reference Architecture 1.1 Overall Architecture For the purpose of discussion, it is necessary to provide a reference architecture that includes all the key components and interfaces. The reference architecture described here provides a basic architectural framework describing the logical modules and interfaces as well as key functional flows. It is appreciated that the invention contemplates that various changes may be made to the architecture and that the architecture described below is a preferred embodiment of the invention.

1.1.1 Reference Architecture Description

Figure 1:
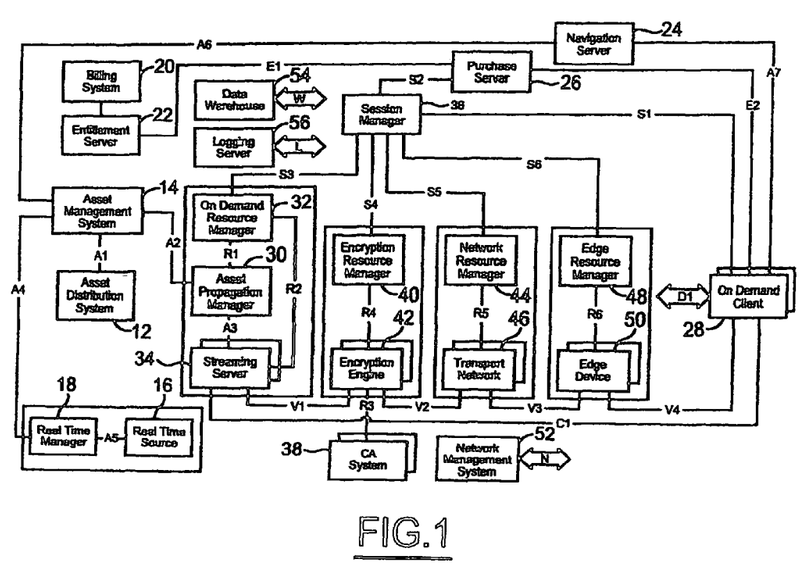
FIG. 1 describes a reference architecture for on demand video services where tokens and policy descriptors are used for on demand session management.

The block diagram in FIG. 1 describes the proposed reference architecture for the next generation on demand video services. The initial focus of the architecture will be on the Video On Demand services but the architecture can be expanded to support other on demand services such as Switched Broadcast Video or networked PVR.

The reference architecture consists of a number of logical components and interfaces among them. The architecture and interfaces allow that single or multiple logical components be implemented in one physical module.

Logical Components

The architecture is partitioned functionally into a number of logical components. Each component is defined in such a way that the interchangeable module implementing the common interfaces can be introduced to work with the rest of the system. For example, multiple Streaming Servers can be introduced into the system as long as they implement the defined interfaces.

It is anticipated that in some cases, implementations may integrate several components into a single product or solution. This may potentially lower both capital and operational costs, as well as potentially increase the efficiency of the overall system. This integration does not mean that each of the logical components does not have to implement the relevent interfaces. For example, certain resource management components might be implemented in an integrated fashion with the session manager; in this case the relevant resource management interfaces must still be implemented and exposed.

Each logical entity described in the reference architecture may represent one or many physical entities in an actual implementation. For example, there may be multiple servers implementing the Session Manager (SM) for the purpose of load balancing and scalability.

The On Demand Client is typically located at the digital set-top box in the subscriber home. Any gateway server that is communicating with the other headend components on behalf of the digital set-top box will be considered as part of the On Demand Client. All other components are located at cable operators' master headend, secondary headend, or remote hub, depending on the specific deployment configuration and network topology. It would be preferable to have as much flexibility as possible in the placement of components, to accommodate the various physical deployment scenarios that exist in various divisions and regions. Gigabit Ethernet switching and transport greatly facilitates this, however interfaces need to be designed while keeping in mind that the physical location of various components vary in different deployment.

The key logical components include:
Asset Distribution System (ADS) (12)—distribute asset from content providers' or aggregators' premises to the network operators.
Asset Management System (AMS) (14)—validate and manage life cycle of asset content and metadata.
Real Time Source (RTS) (16)—capture real time contents such as those from real time encoder.
Real Time Manager (RTM) (18)—manage real time source such as capturing schedule from a programming channel.
Billing System (20)—manage customer billing and service subscriptions.
Entitlement Server (ES) (22)—manage entitlement and transaction.
Navigation Server (24)—present assets and service offerings and manage the navigation from the subscribers.
Purchase Server (26)—validation purchase from the subscribers with the Entitlement Server, perform session authorization.
On Demand Client (28)—provide interfaces with on demand headend components and enable end user application. It may include any gateway server that serves as proxy of the set-top box.
Asset Propagation Manager (APM) (30)—manage asset propagation across multiple streaming servers.
On Demand Resource Manager (ODRM) (32)—manage resources required at the Streaming Servers.
Streaming Server (SS) (34)—output video stream and manage stream control.
Session Manager (SM) (36)—manage life cycle of session for on demand video services requested by subscriber.
Conditional Access System (CAS) (38)—perform Conditional Access for the on demand video services.
Encryption Resource Manager (40)—manage encryption configuration for each session.
Encryption Engine (42)—perform encryption of video service associated with the session, can be located anywhere between video server and edge device.
Network Resource Manager (NRM) (44)—manage resource required in the transport network for each session.
Transport Network (46)—transport video services from server to edge.
Edge Resource Manager (ERM) (48)—manage resource required at the edge for each session.
Edge Device (50)—perform re-multiplexing and QAM modulation.
Network Management System (NMS) (52)—provide network management for all the components in the headend.
Data Warehouse (DW) (54)—provide reporting and analysis of data collected from on demand systems for data warehousing.
Login Server (LS) (56)—collect logging data from various components for diagnosis and event tracing purposes.

1.1.2 Interfaces

The main objective for the open architecture is to define and standardize the interfaces and protocols among various components. Both data and control plane interfaces need to be defined. An example of data plane interface is the transport protocol that carries on demand video content from Streaming Server to Edge Devices. An example of control plane interface is the resource signaling between Session Manager and On Demand Resource Manager.

In addition, management plane interfaces need to be defined in order to address the management of all the headend components in the architecture. Standard protocols such as SNMP (Simple Network Management Protocol) can be used for this purpose.

The key interfaces can be categorized as the following:
Asset Interfaces: A1 to A7, define asset management interfaces.
Session Interfaces: S1 to S6, define session management interfaces.
Resource Interfaces: R1 to R6, define resource management interfaces.
Entitlement Interfaces: E1 to E2, define entitlement management interfaces.
Stream Control Interface: C1, define stream control interfaces.
Client Auto-Discovery Interface: D1, define client auto-discovery interfaces.
Video Transport Interfaces: V1 to V4, define video transport formats from streaming server to edge.
Network Management Interfaces: N, define network management interfaces.
Data Warehousing Interfaces: W, define reporting interfaces with Data Warehouse.
Logging Interfaces: L, define event logging interfaces with Logging Server.
Service Discovery Interfaces: D, define service and resource discovery between various on demand components in the headend.

1.1.3 Deployment Configuration

In an actual deployment, a number of key decisions have to be made in the overall system configuration. As long as the functionalities and interfaces are consistent with those proposed in the reference architecture, one can use a variety of deployment configurations. For example, these may include:
Distributed or centralized deployment architecture (e.g. video servers, asset management systems, or Session Manager).
Native or middleware based approach.
Network transport mechanism (e.g. Gigabit Ethernet, SONET).
Locations of various headend components (e.g. multiplexer, encryption engine, or QAM).
Application and business logic.

Figure 2:
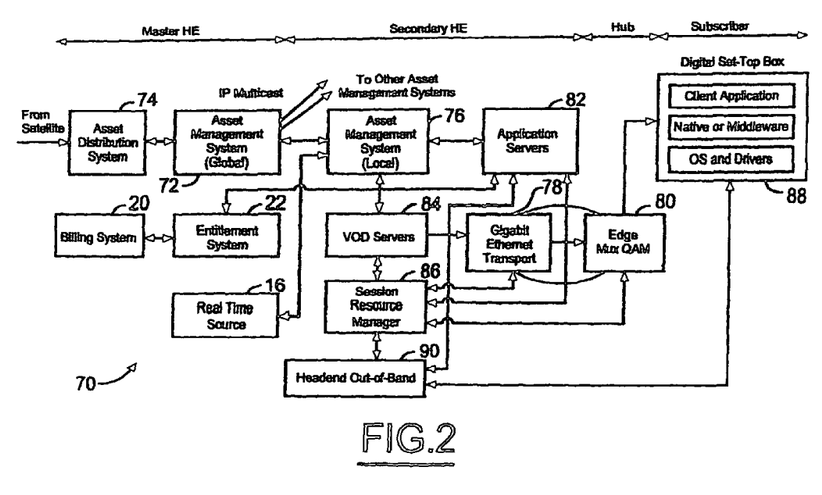
FIG. 2 describes an example VOD deployment architecture.

An example VOD deployment architecture 70 is described in FIG. 2. In this example, a global Asset Management System 72 is used at master headend to aggregate assets from the Asset Distribution System 74. It serves multiple local Asset Management Systems 76 at secondary headends. In addition, Gigabit Ethernet network transport 78 is used in conjunction with Edge QAM devices 80. Architecture 70 also includes Application Servers 82, VOD Servers 84, Session Resource Manager 86, Digital Set-Top Box 88, and Headend Out-of-Band (block) 90.

1.2 Logical Component Descriptions 1.2.1 Asset Distribution System (ADS) (12)

There are basically two types of asset: Content Asset and Metadata Asset. A Content Asset always has a Content File such as an MPEG file. A Content Asset has associated metadata that is intrinsic in describing the Content File such as coding format and bitrate. A Metadata Asset contains various type of the data that provide further information about the Content Asset such as ProviderID and AssetID as those defined in the CableLabs ADI 1.1 specification.

Asset Distribution System (ADS) is used to transport assets from content providers' or aggregators' premises to the cable operators' media center or headend.

Typically, the Asset Distribution System (ADS) contains one or multiple Pitchers that broadcast assets over a distribution network to multiple Catchers. Catcher will temporarily store the assets before they are transferred to the Asset Management System (AMS).

The other functionalities of ADS may include:
Multiple physical network support: satellite, IP backbone, etc.
Multiple transport support: broadcast, IP multicast, unicast, etc.
Private encryption schemes.
Asset scheduling, updating, and reporting.

1.2.2 Asset Management System (AMS) (14)

The Asset Management System receives asset that include asset metadata and content files from Asset Distribution System using the Asset Distribution Interface (Interface A1). A number of processing steps will happen at the AMS. They may include:
Receiving and storing of assets.
Asset metadata validation.
Asset metadata modification.
Asset life cycle management (create, modify, delete, etc.).
Delivering asset to Asset Propagation Manager (via Interface A2).
Publishing asset metadata to Navigation Server (via Interface A6).

In an actual deployment, multiple Asset Management Systems can be used to provide hierarchical asset management and propagation. For example, a global AMS can be deployed at cable operator's media center and interface with ADS. It will populate assets to several local AMS at the cable operator's headend. Interfaces such as IP multicast can be used between global and local AMS. For the purpose of this specification, the global or local AMS is treated as a single logical entity in the reference architecture.

It is desired that the AMS provides unified asset management to manage a variety of assets. These may include movies, HTML files, graphics, music, and real time contents such as those from the Real Time Source (RTS).

1.2.3 Real Time Source (RTS) (16) and Real Time Manager (RTM) (18)

In a typical VOD system, the video assets are pre-encoded and packaged before distribution through the Asset Distribution System. On the other hand, several services require that video is encoded real time or recorded from a Real Time Source (RTS) such as digital broadcast feeds at the cable operator's location. For example;
Free VOD service: broadcast video can be encoded at the cable operator's headend in real time.
Networked PVR: analog broadcast programming can be encoded and captured. Digital broadcast programming can be recorded.

The Real Time Manager (RTM) is defined as the component in managing the capturing operation of the Real Time Source (RTS) such as source identifiers, start and end time (via Interface A5). The metadata for the captured video is imported into the Asset Management System (AMS) from the Real Time Manager (RTM) (via interface A4). The video content file itself propagates from the Real Time Source (RTS) directly to the Streaming Server or other components as required directly via various unicast and/or multicast protocols.

1.2.4 Billing System (20)

There are several main functionalities of the billing system for on demand video services. They may include:
Subscriber information management.
Subscription of services for each subscriber based on service definition and subscriber ID.
Billing and transaction information collection.

The proposed reference architecture uses the Entitlement Server (ES) to provide an interface abstraction layer to the billing system.

1.2.5 Entitlement Server (ES) (22)

The Entitlement Server (ES) provides interface abstraction layer between on demand system and cable operator's billing system. Typically, the ES will implement billing interfaces that integrate with the billing system. The ES then provides open interfaces to other components in the on demand architecture to enable entitlement and transaction management.

There are several main functionalities of the Entitlement Server:
Operators may provide to subscribers various on demand services each being uniquely identified with ID, description, etc. Each service may contain offerings of on demand contents with specific prices. The key part of the Entitlement Validation process is to answer the question of whether or not the subscriber is entitled to receive the Service and its associated Offerings.
Subscribers subscribe Services and purchase the Offerings through a variety of means. Subscriber will have to send the purchase request message to the Purchase Server that will perform entitlement check with the ES. The Purchase Server "knows" the relationships between particular Applications and Services. The Entitlement Validation process at the ES "knows" the relationships between particular Services and the set-top box/subscriber ID and other information such as Zip code.
If the subscriber is entitled and makes a specific purchase, the transaction is posted to the ES via the Purchase Server. The ES will then post the transaction to the billing system via billing interfaces. The ES is also responsible for other entitlement functions such as credit check.

1.2.6 Navigation Server (24)

The reference architecture uses the Navigation Server as the logical entity to abstract application specific logic for asset navigation of on demand services. The Navigation Server obtains information necessary for the on demand application from other components, such as the asset metadata from the Asset Management System. The Navigation Server presents the navigation menu and related application features to the On Demand Client and exchanges messages with the On Demand Client to enable the navigation functions.

The Navigation Server needs to query and update the asset metadata from the AMS (via Interface A6). The timeliness of the asset status update is critical to a quality of end user navigation experience and the view of the asset list from each navigation server may vary based on criteria such as geographical location.

The Navigation Server may provide other application specific functionalities. For example, a Navigation Server can provide the following functions to the subscribers:

Menu, logo, and background images of application.
Navigation of on demand content catalog, genre, etc.
VCR control bar for viewing of content.
Parental control PIN management.
"My Rental" list.

1.2.7 Purchase Server (26)

The reference architecture uses the Purchase Server as the logical entity to abstract application specific logic for purchase and authorization of on demand services. The Purchase Server obtains information necessary for the on demand application from other components, such as the subscriber entitlement information from the Entitlement Server. The Purchase Server receives the purchase requests from the On Demand Client and checks the Entitlement Server (ES) to enable the purchase authorization. Several key server side interfaces need to be defined. Specifically:

Entitlement interface: the Purchase Server needs to interface with Entitlement Validation process of the ES for authorization of the service (via Interface E1). The subscriber entitlement information that the Purchase Server retrieved from the ES may be cached to reduce latency.

Session authorization: the session signaling message from Session Manager needs to be sent to the Purchase Server for real time authorization of the session (via Interface S2). The completed session shall constitute a transaction that needs to be posted to the ES by the Purchase Server.

It is possible that the Navigation Server and Purchase Server are implemented in one combined module called the Application Server that may also provide other application functionalities. For the purpose of this specification, they are treated as separate logical components.

1.2.8 On Demand Client (28)

The On Demand Client is defined as a collection of the modules at the digital set-top box and/or any gateway server that may serve its proxy to communicate with the other NGOD components. The key messages and protocols between the On Demand Client and other NGOD components include:

Asset messages: query and update the list of assets and their metadata with the Navigation Server (via Interface A7).

Entitlement messages: request purchase authorization for a particular service offering with the Purchase Server (via Interface E2).

Session signaling protocols: session setup or teardown interfaces with the Session Manager (via Interface S1).

Stream control protocol: VCR control interfaces with the assigned Streaming Server (via Interface C1).

Client auto-discovery interfaces: Auto-discovery of the Edge QAMs that will serve the specific set-top box. (via Interface D1).

The specific interfaces within the On Demand Client such as those between the set-top box and any gateway/proxy server are not subject of this specification. They are usually optimized for different types of digital set-top boxes. For example, for low end set-top boxes with limited out-of-band channel, processor, and memory capacity, data carousel is commonly used to broadcast top asset lists and their metadata. Two-way asset query via out-of-band channel combined with in-band downstream channel may also be used. For set-top boxes with DOCSIS modem and more processor power and memory capacity, asset query via DOCSIS channel is more feasible.

1.2.9 Asset Propagation Manager (30)

The Asset Propagation Manager is responsible for managing the asset propagation from the various content sources such as AMS and RTS to the appropriate Streaming Servers (via Interfaces A3). This important function is sometimes called "Propagation Service". The policy of the Propagation Service may be determined by a number of factors. For example:

Storage capacity: determine if there is enough storage for content files.

Content duplication: determine whether the content needs to be duplicated in a distributed manner.

The interface between Asset Propagation Manager and Streaming Server (Interface A3) is defined so that Streaming Servers from multiple vendors can be introduced to work within the same propagation service framework. It is essential that this interface hide the internal implementation of the storage system of the Streaming Server. The interface may include parameters such as the required storage capacity, ingest bandwidth, and whether to duplicate a content file to multiple Streaming Servers.

1.2.10 On Demand Resource Manager (32)

The On Demand Resource Manager is responsible for allocating and managing the streaming resources that are required from the Streaming Servers. Upon the session setup request from the client, the Session Manager (SM) will request resources from the On Demand Resource Manager (via Interface S3), in conjunction with the resources of other components in the overall system. The resources allocated by On Demand Resource Manager may include:

Selecting Streaming Server: This is based on the locations of the requested asset among the Streaming Servers that can be retrieved from the Asset Propagation Manager (via Interface R1).

Allocating streaming resource: This includes the allocation of the streaming resources of the selected the Streaming Server that contains the parameters such as streaming port and bandwidth (via Interface R2).

1.2.11 Streaming Server (34)

The Streaming Server is responsible for streaming digital video to the digital set-top boxes using the Hybrid Fiber Coax network via the transport network and edge devices. In a typical system, large storage disk arrays are used to store MPEG video content with fault tolerance capability. The servers typically output MPEG-2 Single Program Transport Streams (SPTS) over UDP/IP and Gigabit Ethernet.

Typically, single or multiple Streaming Servers may be deployed across the network. Streaming Servers may be deployed at a centralized headend or at distributed remote hubs or both. The choices of deployment architecture can be driven by a number of factors such as operational feasibility, network transport availability, scalability, content caching and propagation, and the overall cost.

It is critical to define the architecture and interfaces in such a way that allows the introduction of new low cost and high performance video servers, leveraging future innovations in storage, networking, and content distribution technology. The architecture and interfaces shall enable the deployment of the Streaming Servers from multiple vendors within the same headend, serving the same client devices.

Typically, the Streaming Server also handles the VCR like stream control such as pause, fast forward, fast rewind etc. The trick mode files for contents can be generated ahead-of-time or on the fly by the Streaming Server.

1.2.12 Session Manager (SM) (36)

The Session Manager (SM) is responsible for managing the life cycle of sessions for on demand services.

On demand applications often require the establishment of sessions. A collection of server and network resources needs to be reserved for the session for certain duration of time. Typically, the SM will perform the following functions:

- Communicate with the On Demand Client regarding session setup, session status, and session tear down. P0 Interface with the corresponding Purchase Server to authorize the session requested by the subscriber.
- Allocate the resources required for the session by negotiating with the resource managers for appropriate server and network components.
- Dynamically add, delete, or modify the resources associated with the session to support integration of multiple on demand services.
- Manage the Quality of Service for the session.
- Manage the life cycle of the sessions.

One of the main functions of the SM is to obtain required resources for the session by negotiating with resource managers of the relevant server and network components. They include:

- Interface with On Demand Resource Manager to determine the Streaming Server resources such as asset location, allocated streaming server and output port, and source UDP/IP parameters etc. (Interface S3).
- Interface with Encryption Resource Manager to determine encryption resources required for the session. (Interface S4).
- Interface with Network Resource Manager to determine the unidirectional path that will route the requested video stream to the edge devices covering the service group the subscriber resides. (Interface S5).
- Interface with Edge Resource Manager to determine the resources used at the edge devices such as bandwidth required and MPEG tuning parameters so that the digital set-top box can tune to the MPEG program that carries the requested content. (Interface S6).

The Session Manager (SM) will need to negotiate with On Demand Resource Manager, Edge Resource Manager, and resource managers for other components to allocate resources to enable streaming video from any server to any edge. For example, the asset files may not be available in the streaming server that is connected to the identified network path to the subscriber. An alternate server and network path may have to be used. Therefore, the SM will need to negotiate with the On Demand Resource Manager and other resource managers to reconcile the differences.

Multiple types of the Session Managers may be used while sharing the same Resource Managers and underlying resources. This will allow the Session Manager to be further optimized for variety of applications. For example:

- Interactive Session Manager can be used to manage interactive sessions such as those used in VOD.
- Switched Broadcast Session Manager can be used to manage sessions used in Switched Broadcast Video services.

1.2.13 Conditional Access System (CAS) (38)

The Conditional Access System (CAS) is responsible for the overall security of the on demand video services. In addition to supporting the legacy CAS already deployed in the field, the architecture shall allow introduction of new CAS in the same or different headends.

In a typical Conditional Access System (CAS), the encryption of digital services can be achieved by using the Entitlement Control Messages (ECM) and Entitlement Management Messages (EMM). ECMs are used to secure the control words that are required to scramble the packets. EMMs are used to enable specific users to retrieve ECMs that are required to decode the control words and de-scramble the packets.

Open interfaces are required on the CAS to enable the access of ECMs and EMMs as well as other configuration information.

In case of pre-encryption, ECMs/EMMs are generated in such a manner to enable a group of digital set-top boxes to access content that has been pre-encrypted and stored at the server ahead of time. In case of real time encryption (tier or session based), ECMs/EMMs are generated and assigned to a particular session. The content has to be scrambled on the fly at the Encryption Engine based on the ECMs generated by the CAS.

Whether the content needs to be encrypted may be determined by a number of factors. Content providers can require the asset to be encrypted by enabling the "Encryption" field in the corresponding asset metadata file as defined by Content Specification 1.1. Network operators can also require the specific service to be encrypted. In addition, the system shall be able to identify which CA system to encrypt the content in case of multiple CAS headend.

There are a number of ways that ECMs/EMMs can be transmitted to the digital set-top box. For example, they can be transmitted in the corresponding MPEG in-band channels, or transmitted via the out of band channels.

1.2.14 Encryption Resource Manager (40)

The Encryption Resource Manager is responsible for managing the Encryption Engines and provisioning the encryption resources required by sessions (via Interface R4). These Encryption Engines may be located anywhere from the server to the edge.

The Encryption Resource Manager plays a central role in the case of real time encryption (tier or session based) as well as pre-encryption.

1.2.15 Encryption Engine (42)

The Encryption Engine performs real time encryption of the MPEG-2 packets carrying on demand content. It can be located anywhere between Streaming Servers and edge devices. For example, the encryption engine may be embedded in the multiplexer or edge QAM devices.

In order to perform the real time encryption (tier or session based), the Encryption Engine needs to retrieve the appropriate parameters such as the ECMs (via Interface R3) from the corresponding CA system.

1.2.16 Network Resource Manager (44)

The Network Resource Manager is responsible for allocating and managing the resources that are required in the transport network (via Interface R5). In other words, the Network Resource Manager needs to identify a unidirectional route that transports the digital video stream from the server to the edge devices covering the right service group and traversing the required set of network resources. To enable distributed network resource allocation, network resource management functionality is divided into two logical functions that are implemented in different components. The two logical functions are network resource monitoring and network resource allocation. Network resource monitoring is a function that provides information on the connectivity and available network bandwidth between data plane components while network resource allocation reserves network bandwidth between data plane components. The network resource monitoring function is implemented in a component called the Network Resource Monitor while network resource allocation is implemented in resource managers in NGOD release 1 and the IP transport network itself in future release.

1.2.17 Transport Network (46)

Transport Network is used to transport video streams from the Streaming Server to the Edge Device, potentially via a number of network devices such as encryption engines. Depending on the implementation, a variety of Transport Networks can be used to carry video streams such as Gigabit Ethernet and ATM/SONET; in all cases the video is carried over the transport network using IP packets. The current prevailing technology is to use IP infrastructure via Gigabit Ethernet. Typically, the requested content is carried over the MPEG SPTS (Single Program Transport Stream) and mapped over UDP/IP at the output of the Streaming Server. Gigabit Ethernet switches and/or routers can be used to transport the stream to the right Edge Device based on the configuration from the Network Resource Manager.

1.2.18 Edge Resource Manager (48)

The Edge Resource Manager is responsible for allocating and managing the resources that are required at the Edge Devices such as QAM bandwidth (via Interface R6).

Typically, the Edge Resource Manager needs to allocate specific QAM resource from the Edge Device that can serve the requested set-top box. Upon the resource request from Session Manager for a specific session, the Edge Resource Manager needs to determine the Edge Device to use, input UDP port and IP address, as well as output frequency and MPEG program parameters. Other functionalities of the Edge Resource Manager may also include the bandwidth management and quality of service. For example, in order to support dynamically added content to an existing session, the edge bandwidth may need to be added to the session offered from the same QAM.

1.2.19 Edge Device (50)

The main functions of the Edge Device are to receive the multiple MPEG SPTS carried over UDP/IP from IP transport network, multiplex into MPEG MPTS, and generate QAM modulated signals. The other features of Edge Devices may include:
  MPEG PID remapping.
  PCR (Program Clock Reference) re-stamping.
  Statistical multiplexing.
  Rate Shaping.
  Multicast switching (e.g. for Switched Broadcast).

1.2.20 Network Management System (NMS) (52)

The Network Management System (NMS) is responsible for managing the headend components described in the architecture. Management includes fault detection, status monitoring, and configuration. Commonly used protocols such as SNMP can be used where the appropriate MIBs need to be defined for these interfaces.

Event logging for the key NGOD components can be provided to enable further detailed diagnosis and analysis in various error situations.

1.2.21 Data Warehouse (DW) (54)

The Data Warehouse (DW) is responsible for collecting, analyzing, and reporting of the on demand statistical data retrieved from various components in the architecture such as Session Manager and various Resource Managers.

1.2.22 Logging Server (LS) (56)

The Logging Server (LS) is responsible for collecting event logging data from various components in this architecture. It is used to provide detailed logs of on demand session and resource signaling messages for purposes of diagnosis and event tracing.

1.3 Description of Functional Components in the Preferred Embodiment

Figure 3:
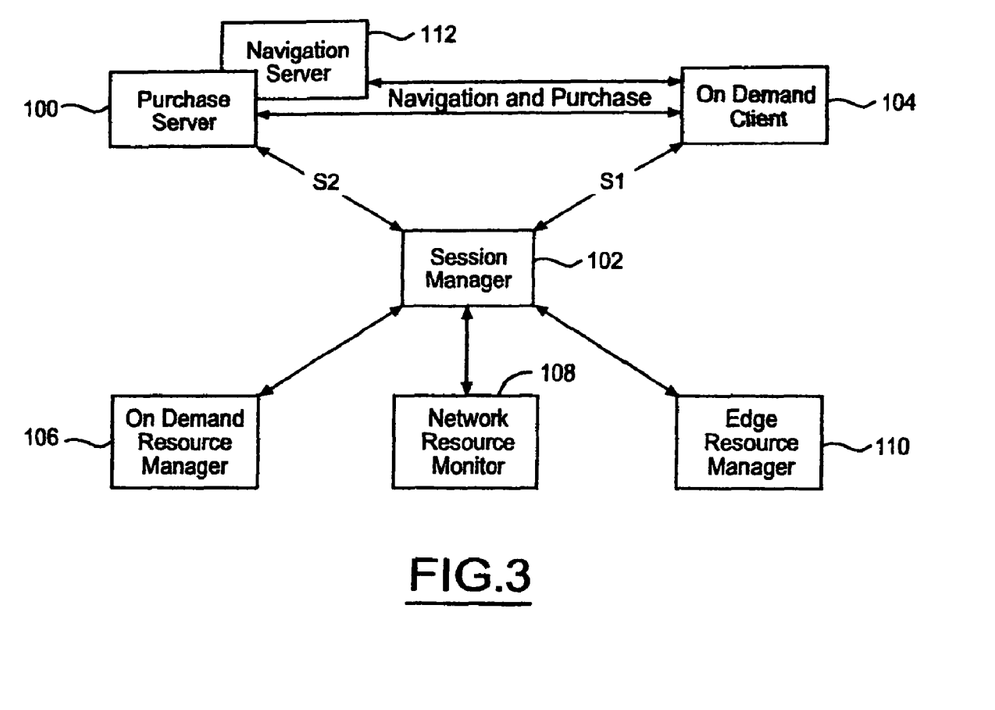
FIG. 3 illustrates the relationship of the components involved in the S2 interface.

FIG. 3 illustrates the relationship of the functional components involved in the S2 interface.

1.3.1 Purchase Server (100)

The Purchase Server 100 is responsible for mapping all assets in the system and presenting those assets to the On Demand Client 104 over the purchase interface. The Navigation Server is shown at 112. As a result of the purchase of the asset, the On Demand Client 104 will be given a Purchase TokenID. The client 104 then signals the network to start a session using the Purchase TokenID. This signaling is performed over the S1 interface.

The Session Manager 102 sends the Purchase TokenID to the Purchase Server 100 in the session setup message defined by S2. The Purchase Server 100 then determines the asset or list of assets to be delivered and instructs the Session Manager 102 to set up a connection between the streaming server that will deliver those assets and an Edge QAM that will transport the asset to the appropriate set-top box. The Session Manager 102 accomplishes this by communicating with the On Demand Resource Manager 106, Edge Resource Manager 110, and Network Resource Monitor 108.

1.3.2 Session Manager (102)

The Session Manager 102 is the Network component responsible for maintaining the integrity of the session resources. It communicates with the On Demand Client 104 over the S1 interface and the Purchase Server 100 over the S2 interface. Based on resource descriptors requested by the Purchase Server 100, it requests resources from the Edge and On Demand resource managers, 110 and 106, and Network Resource Monitor 108.

1.3.3 On Demand Client (104)

The On Demand Client 104 initiates the session request with the Session Manager 102 using the S1 interface. When the session has been set up, it controls the stream by communicating directly with the Streaming Server.

1.3.4 Resource Managers (106, 108, 110)

These components include the On Demand Resource Manager (ODRM) 106, Edge Resource Manager (ERM) 110, and Network Resource Monitor (NRM) 108 and are responsible for tracking network resources and for allocating those resources to sessions. The Session Manager 102 determines which resources to request based on the Resource Descriptors requested by the Purchase Server 100 in the S2 Add Resources messages.

The On Demand Resource Manager 106 is used to select the appropriate streaming resource and set up that resource to deliver the requested assets. The Purchase Server 100 requests a list of assets to be streamed. The On Demand Resource Manager 106 determines the appropriate Stream Server and sets up that resource to stream those assets.

When the session has been established, the stream is controlled directly from the On Demand Client 104.

In the preferred embodiment of the invention, the Purchase TokenID represents a purchase token as generated by the Purchase Server 100 for the client 104 to use. The purchase token generally represents one or more requested assets with a globally unique ID. When the client 104 signals the network to start a session using the Purchase TokenID, the Session Manager 102 sends the Purchase TokenID descriptor, which indicates the Purchase TokenID, to the Purchase Server 100. Purchase Server 100 expands the associated purchase token at session set-up time to generate various dynamic policy management descriptors for the on demand service. These dynamic policy descriptors may include, but are not limited to, dynamic asset play list, priority, CA (conditional access) related descriptor, bandwidth/codec to be required, etc. Some dynamic policy management descriptors involved with the S2 interface in the preferred embodiment are further described below.

The asset list descriptor, for each asset, includes a provider ID, an asset ID, a start time, and an end time. The CA descriptor includes a CA system ID, and additional information regarding copy protection and encryption. The policy descriptor indicates the priority requirements for the session. Along with the Purchase TokenID descriptor, a session group descriptor may also be sent to Purchase Server 100 in the session set-up message when the Purchase TokenID descriptor is sent. The session group descriptor indicates the assigned session group by the Session Manager 102.

It is appreciated that, in accordance with the invention, the purchase token generally represents one or more assets with a global unique ID and is expanded on the Purchase Server side. Using the purchase token, in preferred embodiments, provides a uniform way to authenticate on demand services for a wide variety of interactive content or applications offered to subscribers. In addition, in preferred embodiments, server based policy management that is generated dynamically for each on demand session provides flexibility and offers personalization for various devices and services. In this way, advantageously, business logic on the server side is separated from the client through use of tokens and policy descriptors.

With continuing reference to FIG. 3, the client session interface S1 also involves various resource descriptors. When the client 104 signals the network to start the session using the Purchase TokenID, a QAM list descriptor also appears in the client session set-up request along with the Purchase TokenID. In the preferred embodiment of the invention, if the session set-up is successful, a QAM list descriptor containing a QAM name for the session is sent from Session Manager 102 to the client 104 in a client session set-up confirm message. This QAM name indicates the QAM name selected by the edge resource manager 110 for the session.

In addition, a keep alive time out descriptor may appear in the client session set-up confirm message. In the event that such a descriptor is not present, a default value of, for example, five minutes may be used. Also present when the session set-up is successful is an on demand session ID descriptor generated by Session Manager 102. The on demand session ID descriptor appears in the client session set-up confirm message.

There is also an optional descriptor to indicate the type of stream control protocol for interface C1 between the on demand client 104 and the streaming server. More specifically, a stream control protocol descriptor may be present in the client session set-up request message sent by the client 104 to Session Manager 102 to indicate the stream control protocol types that are supported by the client 104 for the session. Accordingly, the client session set-up confirm message may include a stream control protocol descriptor to indicate the stream control protocol type selected for the session. If the stream control protocol descriptor is not present, a default stream control protocol type used for the session may be LSCP over TCP.

The dynamic policy management descriptors involved with the S1 interface described above for the preferred embodiment are further described below.

The QAM list descriptor, for each QAM, includes a QAM name that is discovered by the client 104. The keep alive time descriptor includes a value that represents the approximate amount of time in milliseconds between attempts by the client to send a client session in progress request to the Session Manager 102. The stream control protocol descriptor, for each stream control protocol type, includes a character stream representing the stream control protocol type. Multiple types can be listed in the client session set-up request message, while the client set-up confirm message, if any, includes a single stream control protocol type.

In another contemplated use of the purchase token, the purchase token may be used to manage the life cycle of a purchase within an authorized time window. This may include the resumption of an existing viewing session or multiple viewing sessions associated within an authorized time window. For example, a user may order a movie, get a purchase token assigned, and set up a session to watch the movie. The purchase token would be authorized for a specific period of time, for example, a 24 hour rental period. In the case of the 24 hour rental period, the user can stop the movie session at any time within the 24 hour window and set up a session with the same purchase token to resume the movie from the time that the movie was left off. This is made possible because the server can make the association with the same purchase token. As well, an implementation of this concept may allow the user to set up any number of new sessions to watch the same movie as many times as the user wants so long as the same purchase token is used within the authorized time window.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method, comprising: sending to an on-demand client device via a data network a purchase token identifier; responsive to receiving from the on-demand client device a first session request including the purchase token identifier, determining a first playlist of a plurality of video content assets based on the purchase token identifier, determining a bandwidth and a codec based on the purchase token identifier, and streaming the first playlist of video content assets encoded by the determined codec to the on-demand client device using the determined bandwidth; and responsive to receiving from the on-demand client device a second session request including the purchase token identifier, determining a second playlist of a plurality of video content assets based on the purchase token identifier and streaming the determining second playlist of video content assets to the on-demand client device.

2. The method of claim 1, further comprising, responsive to receiving from the on-demand client device the purchase token identifier as part of the first session request, determining a stream control protocol type based on the purchase token identifier, wherein streaming the first playlist comprises streaming the first playlist based on the determined stream control protocol type.

3. A method, comprising: responsive to a request for a video content asset from an on-demand client device, sending to the on-demand client device via a data network a purchase token identifier; and responsive to receiving from the on-demand client device a session request including the purchase token identifier, determining a playlist of a plurality of video content assets including the requested video content asset, start times of the video content assets in the playlist, a bandwidth, and a codec, each based on the purchase token identifier, and streaming the video content assets in the playlist encoded by the determined codec in accordance with the determined start times to the on-demand client device and using the determined bandwidth.

4. The method of claim 3, further comprising, responsive to receiving from the on-demand client device the purchase token identifier, determining a stream control protocol type based on the purchase token identifier, wherein streaming comprises streaming the plurality of video content assets based on the determined stream control protocol type.

5. A video delivery system, comprising: a purchase server configured to, responsive to a request from an on-demand client device, send to the on-demand client device a purchase token identifier; and a session manager configured to, responsive to each of one or more session requests from the on-demand client device that include the purchase token identifier, send the received purchase token identifier to the purchase server, wherein the purchase server is further configured to determine, for each of the session requests, a playlist of a plurality of video content assets, a bandwidth, and a codec, each based on the purchase token identifier received from the session manager, and to instruct the session manager to set up streaming of the video content assets of the playlist to the on-demand client device.

6. The video delivery system of claim 5, wherein the purchase server and the session manager are both embodied as a same physical server.

7. The video delivery system of claim 5, wherein the session manager is further configured to, responsive to each of said session requests from the on-demand client device, send to the purchase server both the received purchase token identifier and a session group descriptor identifying a session corresponding to the respective session request.

8. A video delivery system, comprising: a purchase server configured to, responsive to a request for a video content asset from an on-demand client device, send to the on-demand client device a purchase token identifier; and a session manager configured to, responsive to receiving from the on-demand client device a session request including the purchase token identifier, send the received purchase token identifier to the purchase server, wherein the purchase sewer is further configured to determine a playlist of a plurality of video content assets including the requested video content asset, a bandwidth, a codec, and start times of the assets in the playlist, each based on the purchase token identifier received from the session manager, to instruct session manager to set up streaming of the video content assets in the playlist in accordance with the determined start times to the on-demand client device.

9. The video delivery system of claim 8, wherein the purchase server and the session manager are both embodied as a same physical server.

10. The video delivery system of claim 8, wherein the session manager is further configured to, responsive to receiving from the on-demand client device the session request including the purchase token identifier, send to the purchase server both the received purchase token identifier and a session group descriptor identifying a session corresponding to the session request.

11. The method of claim 1, wherein determining the first playlist comprises dynamically determining the first playlist responsive to receiving the first session request, and wherein determining the second playlist comprises dynamically determining the second playlist responsive to receiving the second session request.

12. The method of claim 1, further comprising, generating, responsive to receiving the first session request, an asset list descriptor based on the purchase token identifier, wherein the asset list descriptor identifies start times of the plurality of video content assets of the first playlist.

13. The method of claim 12, wherein the streaming the first playlist comprises streaming the video content assets of the first playlist beginning at the start times associated with those video content assets.

14. The method of claim 3, wherein determining the playlist and the start times comprises dynamically determining the playlist and the start times responsive to receiving the session request.

15. The video delivery system of claim 5, wherein the purchase server is further configured to dynamically determine, for each of the session requests, the playlist based on the purchase token identifier received from the session manager.

16. The video delivery system of claim 5, further comprising an edge device configured to, for each of the playlists, stream the video content assets of the respective playlist to the on-demand client device.

17. The video delivery system of claim 5, wherein the purchase server is further configured to determine, for each of the session requests, an asset list descriptor based on the purchase token identifier, wherein each of the asset list descriptors identifies start times of the plurality of video content assets of the respective playlist.

18. The video delivery system of claim 17, further comprising an edge device configured to, for each of the playlists, stream the video content assets of the respective playlist to the on-demand client device beginning at the start times associated with those video content assets.

19. The video delivery system of claim 8, wherein the purchase server is further configured to dynamically determine the playlist and the start times based on the purchase token identifier received from the session manager.

* * * * *